United States Patent
Henning et al.

(10) Patent No.: US 9,868,511 B2
(45) Date of Patent: Jan. 16, 2018

(54) HIGH LIFT SYSTEM FOR AN AIRCRAFT AND AIRCRAFT HAVING SUCH A HIGH LIFT SYSTEM

(71) Applicant: Airbus Operations GmbH, Hamburg (DE)

(72) Inventors: Frieder Henning, Bremen (DE); Tanno Zantz, Hamburg (DE); Michael Brady, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 127 days.

(21) Appl. No.: 14/608,271

(22) Filed: Jan. 29, 2015

(65) Prior Publication Data

US 2015/0210379 A1 Jul. 30, 2015

(30) Foreign Application Priority Data

Jan. 29, 2014 (EP) .................................... 14153117

(51) Int. Cl.
  *B64C 9/22* (2006.01)
  *B64C 9/24* (2006.01)
  (Continued)

(52) U.S. Cl.
  CPC .................. *B64C 9/22* (2013.01); *B64C 9/24* (2013.01); *B64C 13/50* (2013.01); *F03D 1/0641* (2013.01);
  (Continued)

(58) Field of Classification Search
  CPC .... B64C 3/50; B64C 3/46; B64C 9/14; B64C 9/22; B64C 9/24; B64C 9/26; B64C 2009/143
  See application file for complete search history.

(56) References Cited

U.S. PATENT DOCUMENTS 2,893,258 A * 7/1959 Meyer ................. F16H 25/2015
  192/142 R
4,318,304 A * 3/1982 Lang ....................... B64C 13/28
  74/412 TA
(Continued)

FOREIGN PATENT DOCUMENTS

DE 102004056537 A1 6/2006
DE 102007023394 A1 11/2008
(Continued)

OTHER PUBLICATIONS

European Patent Office, Extended European Search Report for European Patent Application No. 14153117.8, mailed Aug. 14, 2014.
(Continued)

Primary Examiner — Richard R Green
(74) Attorney, Agent, or Firm — Lorenz & Kopf, LLP

(57) ABSTRACT

A high lift system for an aircraft comprises a wing structure and a leading edge slat movably supported relative to a leading edge of the wing structure, the leading edge slat comprises a leading edge and a trailing edge, wherein the trailing edge is configured to take different positions to form a gap between the leading edge slat and the wing structure, a skin and enclosing an interior space of the leading edge slat, the skin having a flexible leading skin section facing away from the wing structure, a flexible trailing skin section facing towards the wing structure, at least one actuation arrangement arranged inside the interior space for selectively introducing a normal force onto at least one of the leading skin section and the trailing skin section.

14 Claims, 6 Drawing Sheets

(51) Int. Cl.
    *B64C 13/50*       (2006.01)
    *F03D 1/06*        (2006.01)
    *B64C 9/14*        (2006.01)

(52) U.S. Cl.
    CPC ....... *B64C 2009/143* (2013.01); *Y02E 10/721* (2013.01)

(56) References Cited

U.S. PATENT DOCUMENTS

| | | | |
|---|---|---|---|
| 6,394,396 B2 * | 5/2002 | Gleine | B64C 3/46 244/1 N |
| 8,534,610 B1 * | 9/2013 | Pitt | B64C 9/24 244/214 |
| 8,596,585 B2 * | 12/2013 | Havar | B64C 9/24 244/204 |
| 8,839,926 B2 * | 9/2014 | Hou | F16D 11/16 192/101 |
| 2005/0252318 A1 * | 11/2005 | Corney | B64C 13/28 74/89.23 |
| 2012/0097791 A1 | 4/2012 | Turner et al. | |
| 2015/0226294 A1 * | 8/2015 | Ziech | F16H 15/52 475/188 |

FOREIGN PATENT DOCUMENTS

| | | | | |
|---|---|---|---|---|
| DE | 102012102746 A1 * | 11/2012 | ........... | F03D 1/0641 |
| WO | 2008084260 A1 | 7/2008 | | |
| WO | 2009150446 A1 | 12/2009 | | |

OTHER PUBLICATIONS

European Patent Office, Communication pursuant to Article 94(3) EPC in Application No. 14 153 117.8-1757 mailed Jun. 23, 2016.

\* cited by examiner

HIGH LIFT SYSTEM FOR AN AIRCRAFT AND AIRCRAFT HAVING SUCH A HIGH LIFT SYSTEM

CROSS-REFERENCE TO RELATED APPLICATION

This application claims priority to European Patent Application No. 14153177.8, filed 29 Jan. 2015, the disclosure of which application is herewith incorporated herein by reference in its entirety.

TECHNICAL FIELD

This application pertains to a high lift system for an aircraft comprising a wing structure and a leading edge slat as well as an aircraft having a wing and such a high lift system.

BACKGROUND

Commercial aircraft for passenger transport usually comprise high-lift systems, which are able to drastically increase the lift of the respective aircraft, such that relatively low flight velocities are necessary during start and landing phases. However, high lift systems usually comprise one or more flow bodies that can be extended relative to a wing structure in order to increase the camber and active surface of the wing, but may also lead to an increased noise.

For meeting more and more stringent noise constraints, it is a constant desire to optimize the aero-acoustic profile of an aircraft. This is especially the case for congested air spaces in Europe and the United States of America, where a lower noise profile may be an enabler for early and late time slots, respectively, for landing and take-off. This may be realized inter alia by an active gap control for leading edge slats, which are able to adjust the gap size between a trailing edge of a leading edge slat and a wing structure, relative to which the leading edge slat is movably supported.

U.S. Pat. No. 8,383,044 shows a rotatable/tiltable trailing edge of a slat.

WO 2008/084260 A1 and WO2009/150446 A1 disclose a kinematic solution for an independent slat edge actuation.

In addition, other objects, desirable features and characteristics will become apparent from the subsequent summary and detailed description, and the appended claims, taken in conjunction with the accompanying drawings and this background.

SUMMARY

A high lift system for an aircraft is provided, which allows an active gap control tier a leading edge slat, which is able to improve the noise reduction and the aerodynamic quality at the same time.

A high lift system for an aircraft is proposed comprising a wing structure and a leading edge slat movably supported relative to a leading edge of the wing structure.

According to an advantageous embodiment, a high lift system for an aircraft, comprises a wing structure and a leading edge slat movably supported relative to a leading edge of the wing structure, the leading edge slat comprising a leading edge and a trailing edge, wherein the trailing edge is configured to take different positions to form a gap between the leading edge slat and the wing structure, a skin enclosing an interior space of the slat, the skin having a flexible leading skin section facing away from the wing structure, a flexible trailing skin section facing towards the wing structure, and at least one actuation arrangement arranged inside the interior space tier selectively introducing a normal three onto at least one of the leading skin section and the trailing skin section, wherein the normal force changes the profile of the skin (and by this the whole shape of the slat) in such a way that the trailing edge changes its position relative to the wing structure to selectively close or open the gap between the leading edge slat and the wing structure.

A leading edge slat is a flow body or an aerodynamic surface situated on the leading edge of a wing structure which, when deployed, allows the wing to operate at a higher angle of attack. The deployment is conducted through extending the slat into a region upstream of a leading edge of the wing. In the context of this embodiment, the leading edge slat also creates a gap between a trailing edge of the slat and the wing structure for allowing air to pass through the gap for entering an upper surface of the wing in order to delay the stall point during high angles of attack. A leading edge of the slat is a region of the slat surface that directly faces into the flow that impinges on the slat. The trailing edge is a region in which the leading skin section and the trailing skin section run out and is a flat or wedge shaped section.

The slat comprises a flexible skin with a closed surface, which means that there are no prominent gaps in the surface, which may hinder the transfer of constraining forces. The skin encloses an interior space of the slat completely, which houses the actuation arrangement.

A core aspect of the embodiment is based on the actuation arrangement, which allows the introduction of a normal force onto at least one of the leading skin section and the trailing skin section, which means that a mechanical force is applied, which force comprises a force vector, that does not lie in a local extensional plane of the respective skin section, into which the force is introduced, but normal thereto, In distinction to the prior art, the embodiment proposes a mechanical actuation concept to achieve an active gap control through structural morphing of a slat body.

The flexible skin has a neutral profile shape, which is a predefined profile shape that is assumed by the slat in a completely unloaded or unaffected situation, i.e. when no load is introduced.

The high lift system according to the embodiment resultantly makes use of a morphing structure of the slat, leading to an adjustable profile shape of the slat depending on the normal force introduced by the actuation arrangement. Due to the closed surface of the skin and the resultant transfer of constraining forces, the slat does not provide a bulging motion, but leads to a change of camber leading to trailing edge being moved relative to the wing structure.

Consequently, no external elements are necessary for adjusting the gap between the trailing edge of the slat and the wing structure and the gap control does not lead to discontinuous aerodynamic characteristics.

In an advantageous embodiment, the at least one actuation arrangement is configured for introducing the normal force in a region distant from the trailing edge, such that due to the change in the profile, pulling forces act onto the trailing edge through the skin. The actuation arrangement may therefore be positioned in a region in which the largest installation space, i.e. possible installation height, is available. By transferring putting forces through the skin, the trailing edge may be moved despite the clear distance between the force introduction and the trailing edge.

In an advantageous embodiment, the actuation arrangement is configured for bending at least one of the leading skin section and the trailing skin section towards the interior space when the normal force is introduced. For example, the actuation arrangement may be supported in structural parts of the slat that allow bending of only one of the trailing skin section and the leading skin section, but may also allow bending of both surfaces. As commonly the leading skin section comprises a larger running length from the leading edge to the trailing edge than the trailing skin section, a change of the profile shape directly occurs when one of the leading skin section and the trailing skin section is bent, due to the transfer of constraining forces, i.e. pulling forces.

As a further embodiment, the actuation arrangement may be configured for bending the trailing skin section towards the leading skin section and the trailing edge of the skin is urged towards the leading edge of the wing structure upon bending the trailing skin section. By this measure, both skin sections are bent towards the interior space depending on their mechanical properties.

In an advantageous embodiment, the actuation arrangement comprises a release means, which is configured for abruptly releasing the normal force introduced by the actuation arrangement. Such a quick-release feature results in letting the slat revert to the neutral profile shape due to the deformation energy stored within the slat structure through its elastic deformation. For example, a formally closed or narrowed slot between the trailing edge of the slat and the fixed wing structure will be opened rapidly. This allows injecting additional mass flow into the flow boundary layer on the wing's upper side needed to avoid or recover an aerodynamic stall. For example, mechanical elements in the actuation arrangement may be disengaged to realize the release means, such as a clutch located between a motor and a driven element, such as a spindle, or alternatively a brake or a mechanical coupling between force introducing levers and a driving element may be used.

In a preferred embodiment, the actuation arrangement comprises a rotary actuator, which is coupled with a lever, pivotably attached to a joint on the inside of at least one of the trailing skin section and the leading skin section. The actuation arrangement may be supported in an interior structure of the slat. The rotary actuator is to be considered a device that provides a rotation about a rotational axis. For example, the rotary actuator may comprise a lever or a bracket having a borehole at a distance to the rotational axis, which is rotated around the rotational axis when the rotary actuator is operated. By simply pivotably coupling a lever with this borehole, the joint on the trailing skin section can be pulled towards the rotary actuator or pushed away. The main advantage of such a rotary actuator lies in a space effective design, which does not require a large installation space between the leading skin section and the trailing skin section, as the rotary actuator does not conduct a linear extension. Furthermore, the transferable torque may easily be adjusted to the expected force, by the integration of gearboxes or by adjusting the torque arm, respectively.

Preferably, the rotary actuator comprises a motor, a clutch and a gearbox, wherein the gearbox is selectively couplable to the motor through the clutch. The gearbox may, as mentioned above, be coupled with at least one lever pivotably, which may be coupled with one of the leading skin section and the trailing skin section. All components of the rotary actuator may be coupled through a transmission shaft, which may extend along a nose region of the slat. The gearbox may be realized as a planetary gear, which is rather compact and allows a high reduction of rotational speed and a clear increase of transferable torque. Also, the gearbox may be of a power hinge type having an output ring gear, to which at least one of the trailing skin section and the leading skin section of the slat is coupled through a rod or a different appropriate means. The motor may be hydraulically or electrically driven. Providing a clutch between the motor and the gearbox allows a rapid release of the applied force, in order to revert the profile shape of the slat to its neutral profile shape, i.e. the clutch may resemble the release means mentioned above.

As gear type also a continuously variable transmission gear may be utilised. With an increase of morphing the required torque increases as well. With a continuously transmission gear it is possible to drive the motor during morphing in the same operating point or the migration of the operating point on the torque-revolution characteristic diagram may be determined. A release of the profile shape of the slat to its neutral profile shape may be accomplished through rotation the rotary actuator backwards or through unpowering the rotary actuator, which should then not be of a self-locking type. The brake then supports maintaining a certain adjusted profile shape.

In a still further advantageous embodiment, a brake is coupled with the motor and the gearbox for selectively arresting the gearbox such that a profile shape is maintainable without the clutch coupling the motor and the gearbox, i.e. in a certain desired position with a certain morphing state of the slat body. Furthermore, the shaft brake may be configured such that it is released only when the motor is operated or in case the clutch is released. If the clutch is placed between brake and gear, for a rapid return of the profile to its original position, the brake may stay in its closed position.

Still further, the rotary actuator may comprise a motor, a brake and a gearbox, wherein the gearbox is permanently coupled with the motor, e.g. through a shaft. The gearbox may also be coupled with a lever and may be designed according to all of the above-mentioned features. Further, all components may be coupled through a transmission shaft, which may extend along a nose region of the slat. In this embodiment, release of the profile shape to a neutral profile shape is accomplished through rotating the rotary actuator backwards or, if the rotary actuator is not self-locking, through opening the brake and unpowering the motor. In the latter case, use of the brake is recommended for maintaining an adjusted profile shape and the brake may resemble the release means.

In a still further advantageous embodiment, the rotary actuator comprises a pair of bevel gears, couplable with a spindle screw, which engages with a screw nut couplable with a coupling element, e.g. a rod, lever or any other appropriate means, for coupling with at least one of the trailing skin section and the leading skin section of the slat. The main extension of the gear may follow the main extension of the motor and a rather high torque may be transferred by the bevel gear pair and an additional increase of transferable torque may be accomplished through the spindle. In this regard, the spindle screw should be designed in such a way that it is not self-locking. This allows to quickly release the introduced force without having to decouple the spindle from the gear, such that the shape reversion is conducted through rotation of the spindle automatically.

Especially for a self-locking spindle a cylindrical or friction ring clutch may be provided between screw nut and the coupling element coupled thereto, wherein the friction ring clutch may be engaged or disengaged, i.e. coupling the screw nut with the levers or uncoupling them. This leads to an abrupt return of the profile shape to its neutral shape. After conducting such a rapid return or release, the spindle screw may drive the screw nut to its start position, where it may be coupled with the levers again, as at the start position the screw nut and the inner ring of the clutch meet the outer part of the friction ring clutch to engage again. In such an embodiment the brake does not need to be released for rapidly opening of the gap between wing and slat and the friction ring clutch resembles the release means.

In a preferred embodiment, a plurality of actuation arrangements are located inside the slat. For example, this may be achieved through a multiplication of actuation arrangements, which may also include the use of a plurality of rotary actuators/motors for driving the components of the actuation arrangement.

Still further, the actuation arrangement may also be configured for introducing a normal force onto both of the leading skin section and the trailing skin section at the same time, such that their distance is decreased upon introducing the normal force. Through such an arrangement, the direction of the introduced force may be better adjusted and the compression effect is improved.

In a still further embodiment, a plurality of actuation arrangements is driven by a single shaft, which is extending along a nose region of the slat. A plurality of rather small actuation arrangements may be distributed along the nose region of the slat for introducing rather small individual compression forces, which increases the reliability and improves the stress distribution along the skin of the slat.

It goes without saying, that such an arrangement may also comprise brakes and clutches for being able to rapidly release the change in profile shape.

Further, if multiple spindle screw nuts are used, the flank angles of the spindle screws coupled therewith may differ, i.e. for providing different motion speeds for the individual spindle screw nuts, which leads to different normal forces onto the leading skin section and the trailing skin section at the same spanwise location or in a variable manner along the spanwise extension. This may allow different morphing requirements along the extension of the slat.

BRIEF DESCRIPTION OF THE DRAWINGS

The present embodiment will hereinafter be described in conjunction with the following drawing figures, wherein like numerals denote like elements, and: All the described and/or illustrated characteristics per se and in any combination form the subject of the embodiment, even irrespective of their composition in the individual claims or their interrelationships. Furthermore, identical or similar components in the figures have the same reference characters.

DETAILED DESCRIPTION

The following detailed description is merely exemplary in nature and is not intended to limit the embodiment or the application and uses of the embodiment. Furthermore, there is no intention to be bound by any theory presented in the preceding background of the embodiment or the following detailed description.

Figure 1:
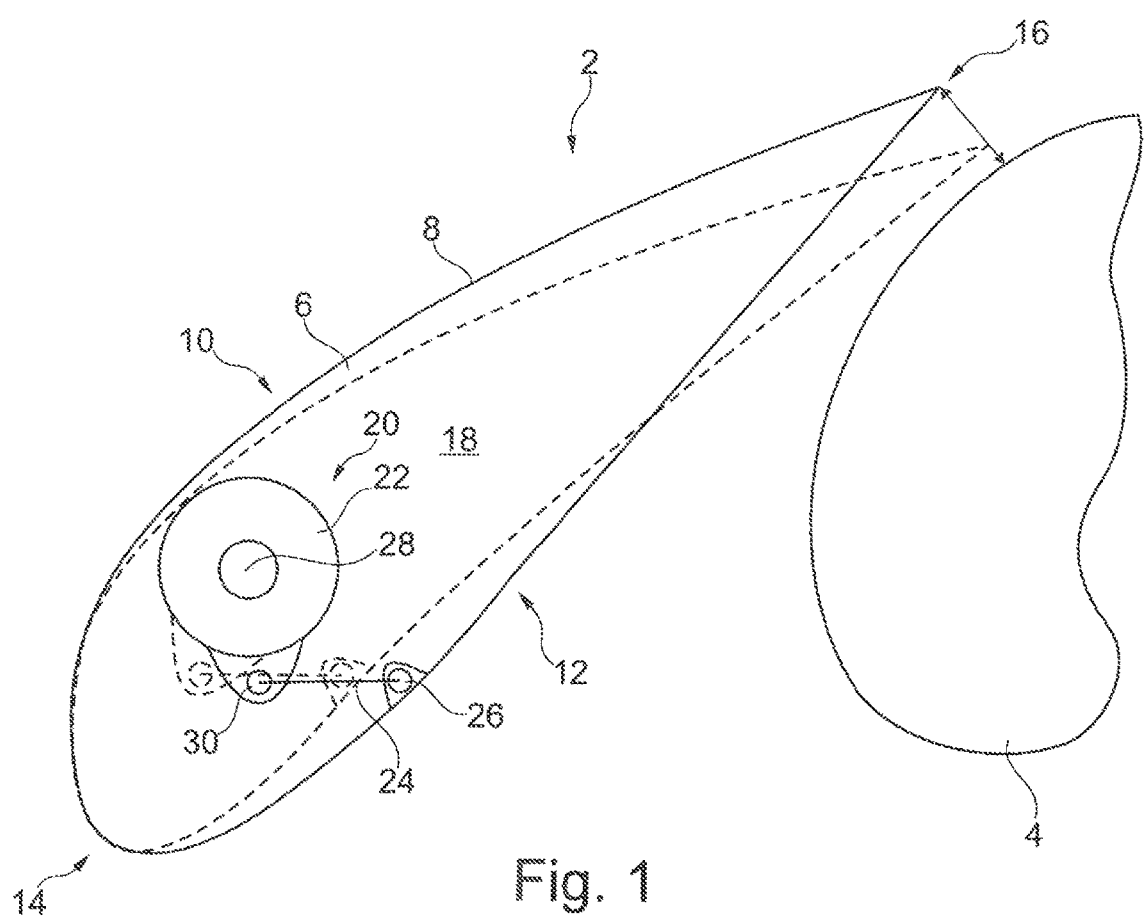
FIG. 1 illustrates a high lift system in a sectional view.

FIG. 1 shows a first exemplary embodiment of the high lift system 2 having a wing structure 4, a leading edge slat 6 movably arranged relative to the wing structure 4, wherein the slat comprises a flexible skin 8 having a leading skin section 10 and a trailing skin section 12, which both extend from a leading edge 14 to a trailing edge 16. Inside an interior space 18 of slat 6, an actuation arrangement 20 is located, which comprises a rotary actuator 22 coupled with a lever 24 and a force introduction joint 26 on the interior side of the trailing skin section 12.

The rotary actuator 22 comprises an axis of rotation 28, about which a borehole 30 is rotated, to which the lever 24 is coupled in a pivotable manner. Hence, when the rotary actuator 22 in a clockwise direction, the borehole 30 pulls the lever 24 and, resultantly, the force introduction joint 26. Hereby, the trailing skin section 12 is bent towards the interior space 18, which leads to a deformation of the profile shape of slat 6.

Due to the closed surface of skin 8, constraining forces, i.e. pulling forces are transferred into the leading skin section 10, altogether leading to a motion of the trailing edge 16 towards the wing structure 4. Hence, by applying a normal force, i.e. a force that at least in part acts perpendicularly, onto the trailing skin section 12, a gap between the slat 2 and the wing structure 4 can be controlled.

Figure 2A:
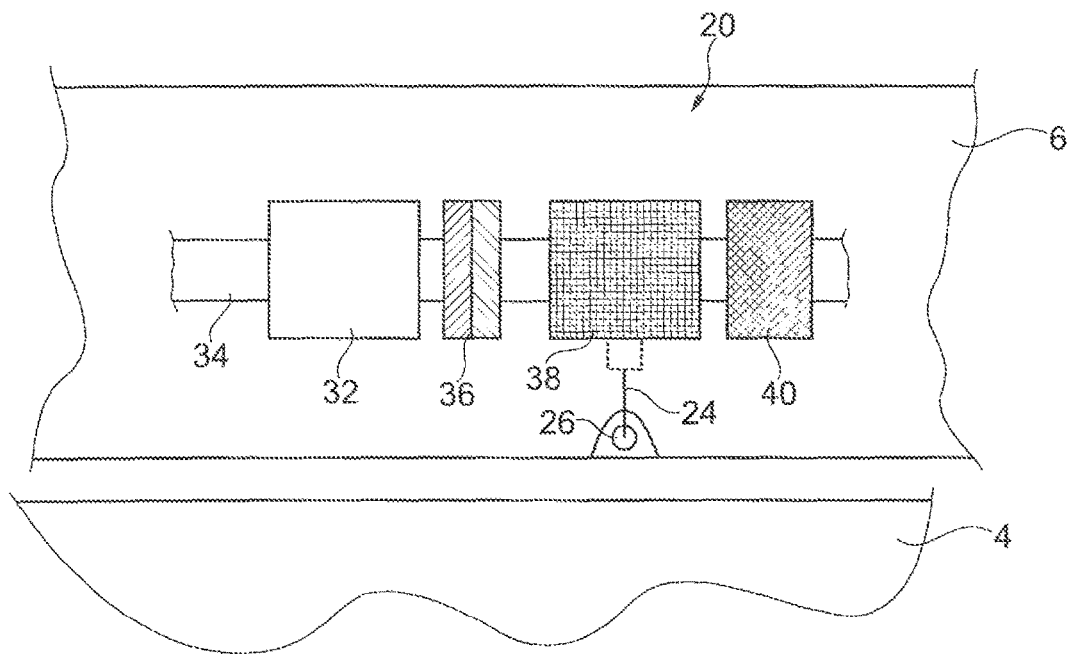
FIGS. 2a and 2b illustrate an actuation arrangement with and without a brake.

FIG. 2a shows an exemplary embodiment of the actuation arrangement 20, comprising a motor 32, which is coupled to a shaft 34, extending at least through a clutch 36, a gearbox 38 and a shaft brake 40. The gearbox 38 provides a reduction of rotational speed and an increase in transferable torque and is coupled with the lever 24, such that rotating the motor 32 leads to an introduction of normal force when the clutch 36 is engaged. By releasing the clutch 36 and the brake 40, the profile shape reverts to is neutral shape.

It is preferred that the shaft brake 40 is only released, when motor 32 is operated. Furthermore, during the introduction of normal force into the force introduction joint 26, deformation energy is built up, which may be released by simply releasing/disengaging the clutch 36.

For example, in case of an aerodynamic stall, clutch 36 and brake 40 are opened by a control unit, which is not shown in FIG. 1 or 2a. Consequently, the deformation energy stored within the slat 6 through its elastic deformation reverts the slat 6 rapidly back to its neutral profile shape, yielding to opening the narrowed gap between the trailing edge 16 of the slat 6 and the wing structure 4 rapidly. Consequently, additional mass flow is injected into the flow boundary layer on the wings' upper side needed to avoid or recover an aerodynamic stall.

Furthermore, the mentioned control unit or an additional control unit may be installed, which is coupled with a set of sensors to monitor the gap between the trailing edge 16 and the wing structure 4 through establishing a closed loop between the rotary actuator 20 and the deformation of slat 6. In addition, it monitors for mechanical or electrical failures and may apply respective countermeasures.

Figure 2B:
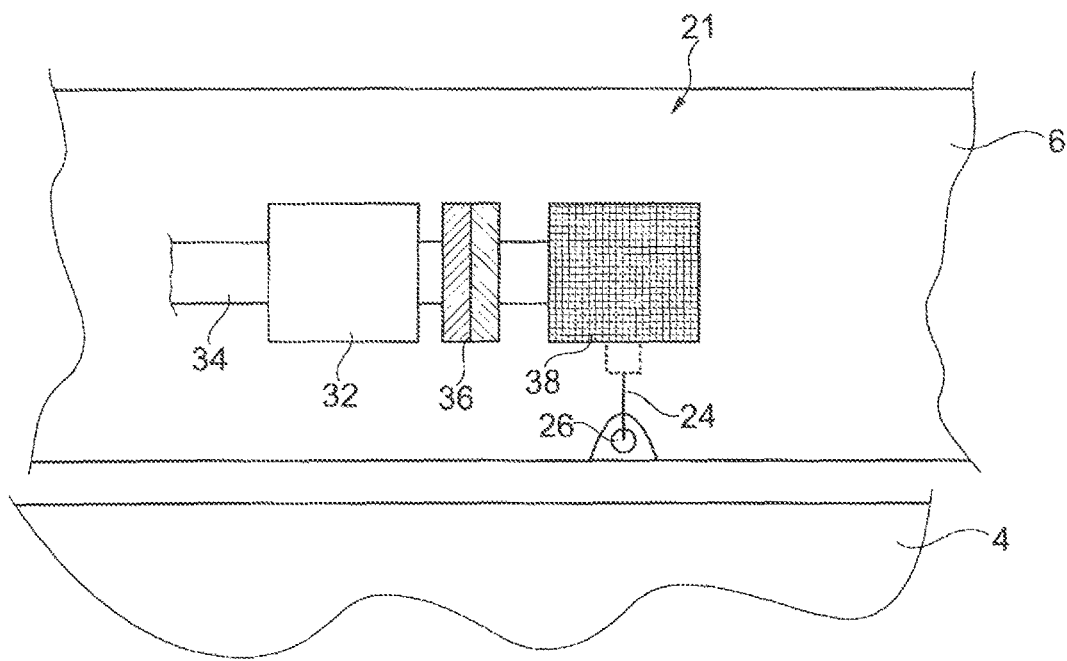

However, as shown in FIG. 2b, the actuation arrangement 20 may be modified to an actuation arrangement 21, which does not comprise a brake 40. Consequently, for rapidly releasing the actuation arrangement 21 only the clutch 36 needs to be opened.

Figure 3A:
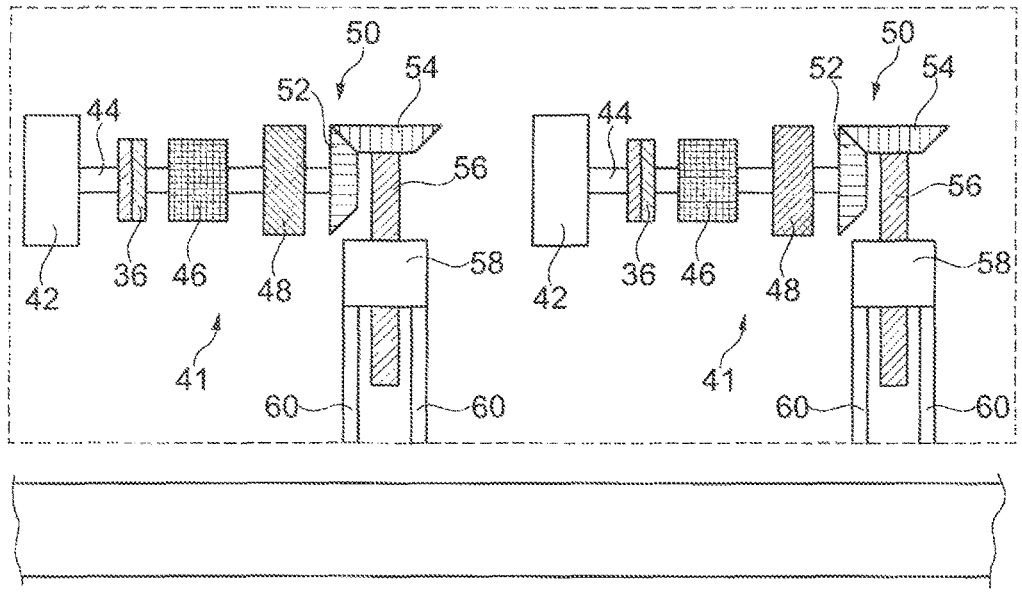
FIGS. 3a and 3b illustrate another actuation arrangement with and without clutches.

FIG. 3a shows another exemplary embodiment with a slightly changed actuation arrangement 20 in form of an actuation arrangement 41. Here, exemplarily two individual motors 42 are shown, which each are coupled to a transmission shaft 44, which extends through a clutch 36, a gear 46 and a brake 48 reaching a pair 50 of bevel gears 52 and 54, for the purpose of changing the rotational axis about 90°, i.e. from a direction along a nose region or the leading edge 14 of the slat 6 to a direction vertical thereto. The pair of bevel gears 50 comprises a first bevel gear 52 and a second bevel gear 54, wherein the second bevel gear 54 is coupled with a spindle 56, which is preferably realized as a ball screw spindle. A screw nut 58 is engaging the spindle 56 and is further coupled to levers 60, which in turn are pivotably coupled with a load introduction joint 26 or any other load introduction joint at the trailing skin section 12.

Both actuation arrangements 41 individually deform a part of the slat 6. It cannot be excluded that the slat 6 comprises even more actuation arrangements 41.

Figure 3B:
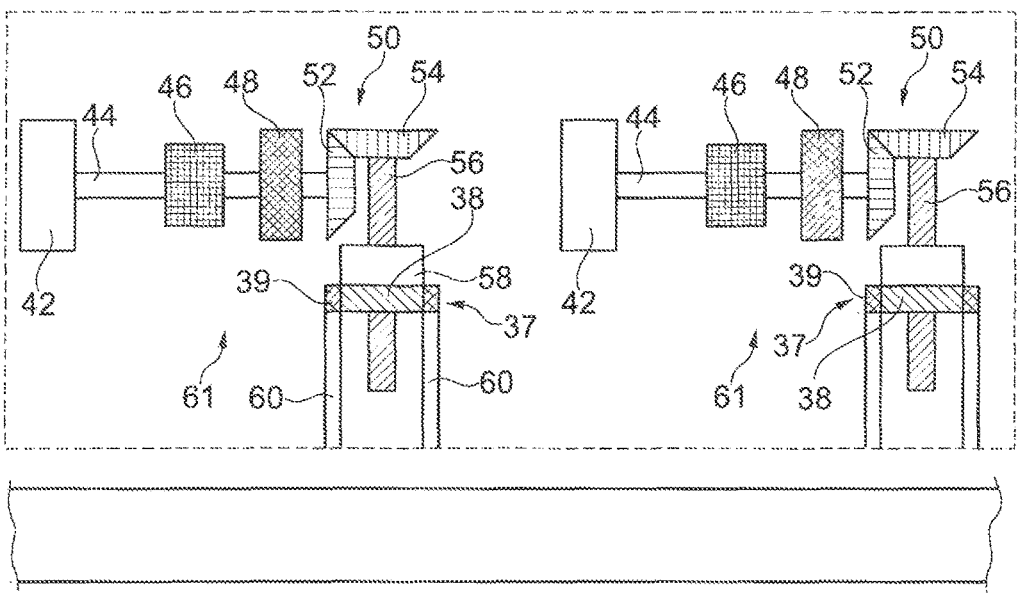

Again, this exemplary embodiment may further be modified by removing the clutches 36, which is shown in FIG. 3b as an actuation arrangement 61. Instead of clutch 36 cylindrical or friction ring clutch 37 may be placed between the screw nut 58 and the lever 60. The inner part 38 of the friction ring clutch 37 is connected to the screw nut 58, while the outer part 39 is connected to the levers 60. The friction ring clutch 37 is to be understood as a device, which is able to provide a mechanical, force-transferring and releasable connection between the screw nut 58 and the levers 60. If the friction ring clutch 37 is released, the levers 60 will not maintain their position adjusted by the screw nut 58 and will follow the trailing edge 16, which will move as the profile shape reverts to the neutral shape. This is especially advantageous when the ball screw 56 is self-locking. After releasing the friction ring clutch 37 with the profile shape differing from the neutral shape, there may be a gap between the screw nut 58 and the outer part 39 of the friction ring clutch 37. This gap may be eliminated by moving the screw nut 58 to the position of the outer part 39 of the friction ring clutch 37, where the friction ring clutch 38 and 39 may be engaged again.

Figure 4A:
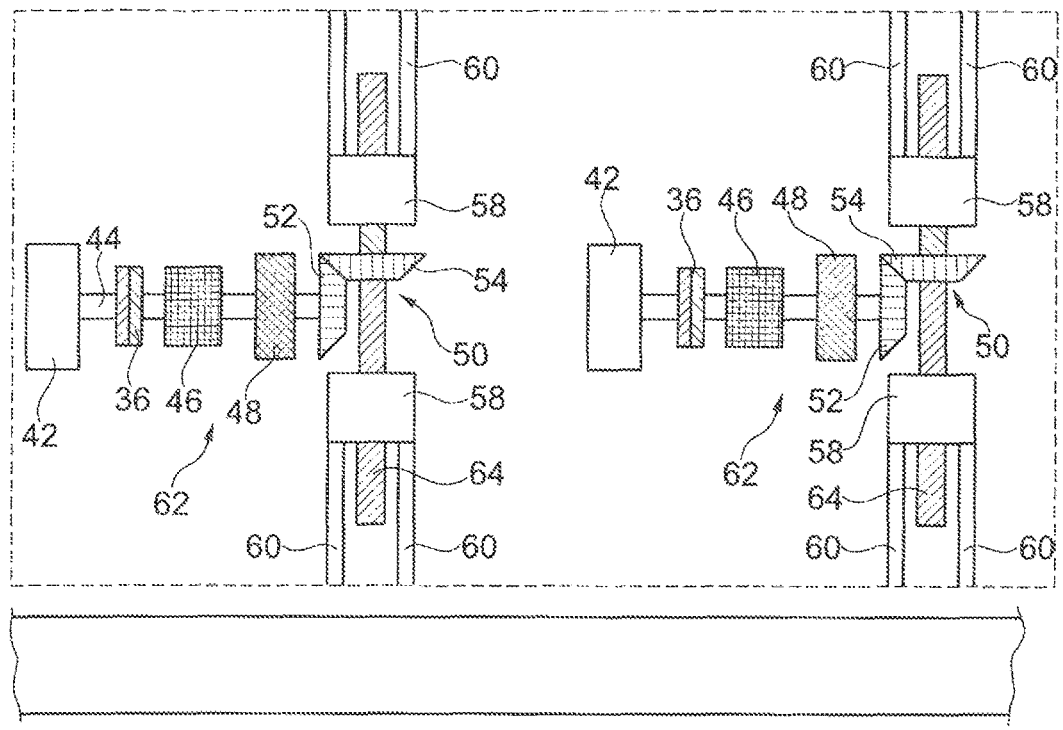
FIGS. 4a and 4b illustrate a still further actuation arrangement with and without clutches.

In a still further exemplary embodiment shown in FIG. 4a, actuation arrangements 62 are shown, which act on the trailing skin section 12 and the leading skin section 10 at the same time. The actuation arrangement 62 may be a similar arrangement as shown in FIGS. 3a and 3b with a motor 42, a transmission shaft 44, a clutch 36, a gearbox 46, a brake 48 and a pair of bevel gears 50 with a first bevel gear 52 and a second bevel gear 54. However, a spindle 64 extends through the second bevel gear 54, such that two screw nuts 58 may engage a single spindle 64, which may comprise two opposed flank angles on two halves of the spindle 64 for allowing expansion and compression through both screw nuts 58. It goes without saying that the flank angles of the two halves of the spindles 64 may differ in their absolute values, such that the trailing edge and the leading edge may be acted upon differently.

Figure 4B:
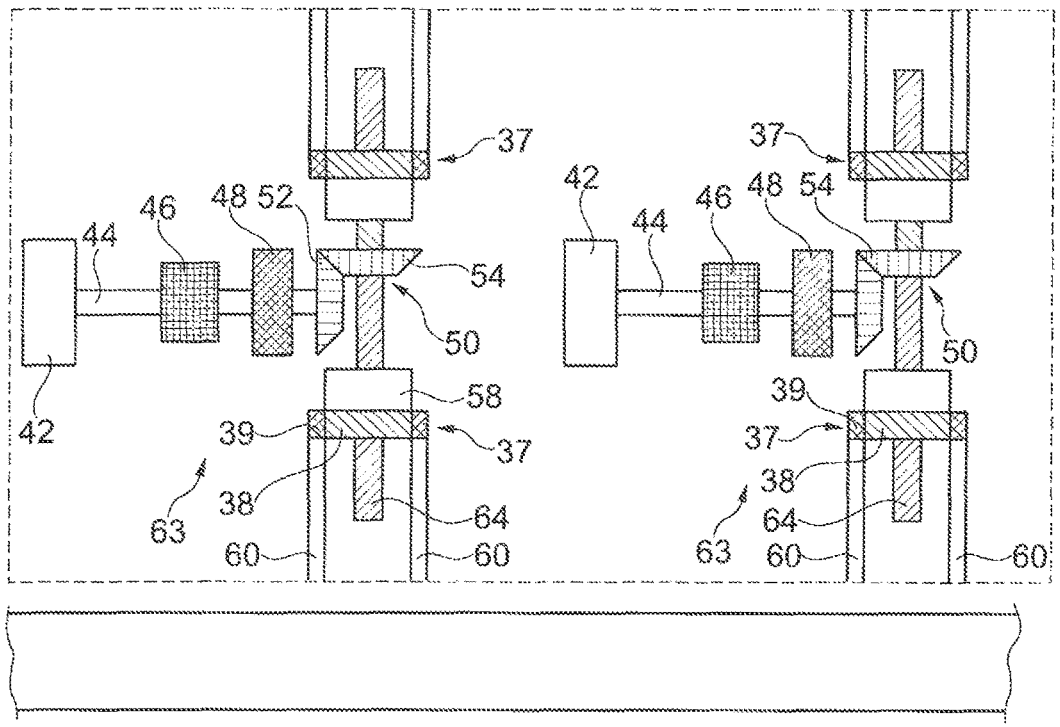

FIG. 4b shows modified actuation arrangements 63, which are realized without the clutches 36, but instead comprise cylindrical or friction ring clutches 37 between the screw nuts 58 and the levers 60, as explained above referring to FIG. 3b. It goes without saying that the friction ring clutches 37 may be used only for the trailing edge, only for the leading edge or for both of trailing edge and leading edge. Again, the flank angles of the two halves of the spindles 64 may differ in their absolute values, such that the trailing edge and the leading edge may be acted upon differently.

Figure 5A:
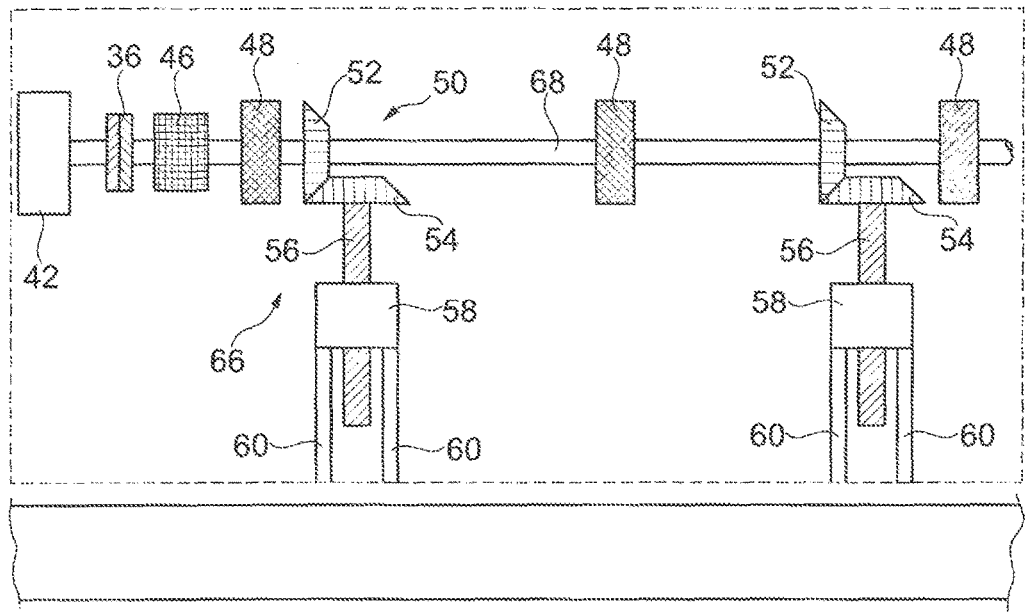
FIGS. 5a and 5b show another still further actuation arrangement with and without an integrated clutch.

In FIG. 5a, the actuation arrangements 41 of FIG. 3a are still further modified in form of actuation arrangements 66 are provided, which instead of a single shaft 44 for each pair of bevel gears 50, a single transmission shaft 68 for both or even more pairs of bevel gears 50 is used. This allows a synchronous rotation of all bevel gears.

Figure 5B:
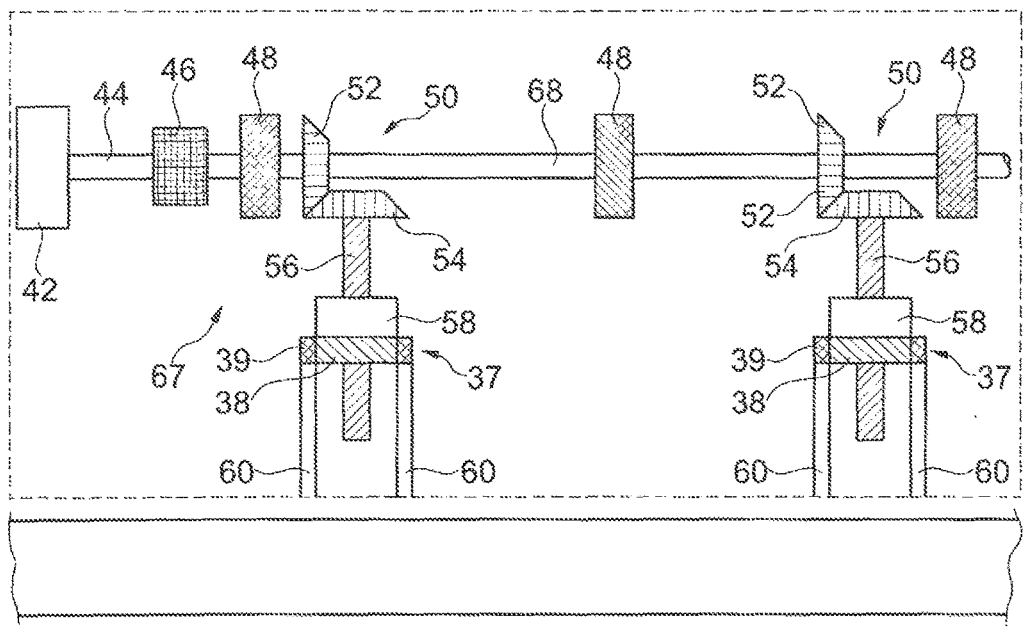

In FIG. 5b, actuation arrangements 67 are provided, which differ from the actuation arrangements 66 of FIG. 5a in that the clutch 36 is removed. Again, they comprise a cylindrical or friction ring clutch 37 between the screw nut 58 and the lever 60, as explained above.

Figure 6A:
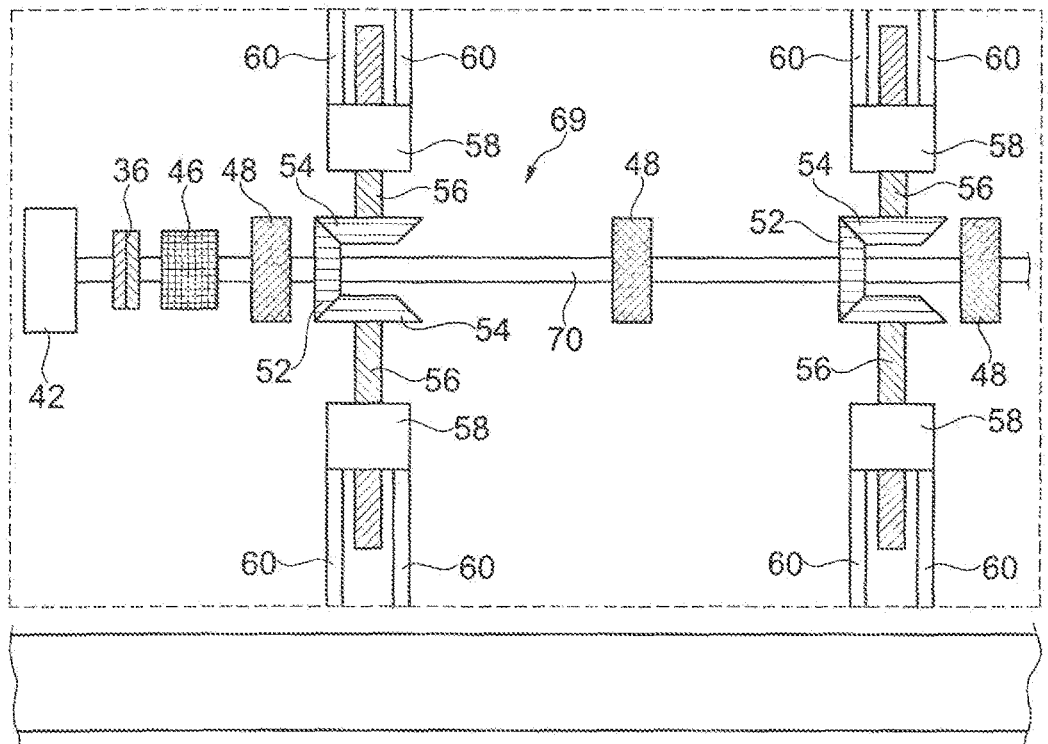
FIGS. 6a and 6b show another actuation arrangement with and without an integrated clutch.

Still further, in FIG. 6a, the same modification is applied to the actuation arrangements 62 of FIG. 4a to form an actuation arrangement 69. This means, that a transmission shaft 70 extends through multiple pairs of bevel gears 50, which in turn rotate individual spindle screws 56 couplable with the trailing edge and the leading edge. As explained regarding FIG. 4a it is possible that the flank angles of the spindle screws 56 coupled with the trailing edge may differ from the flank angles of the spindle screws 56 coupled with the leading edge in their absolute values, such that the trailing edge and the leading edge may be acted upon differently.

Figure 6B:
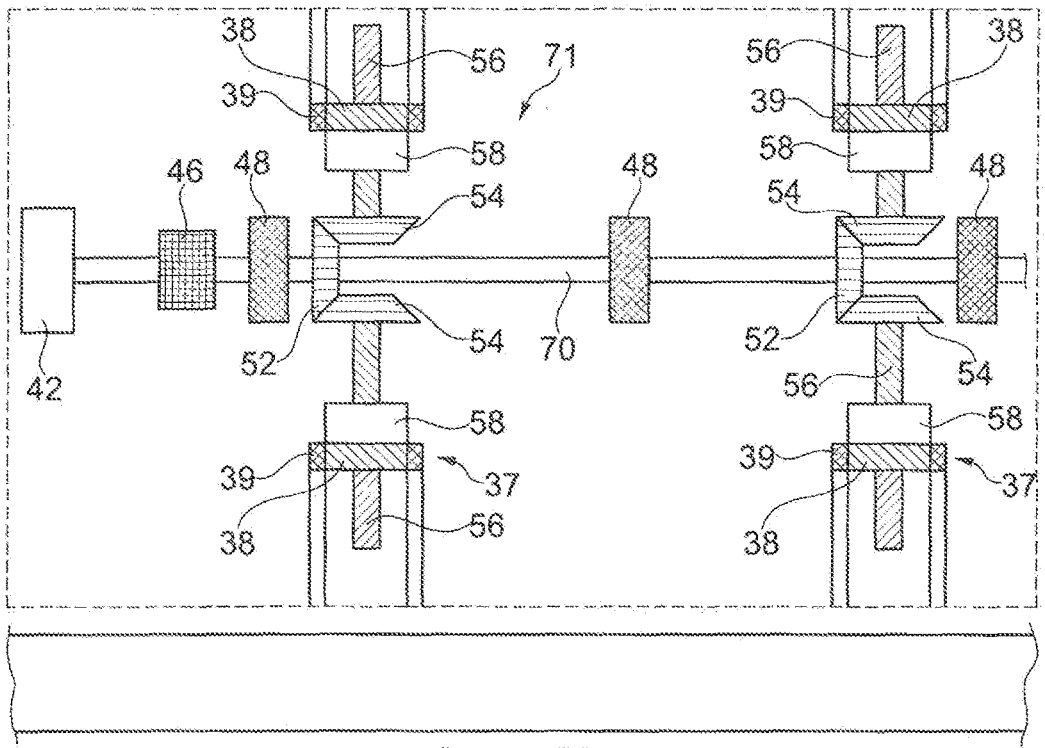

Finally, in FIG. 6b, actuation arrangements 71 are shown, which differ from the actuation arrangements 69 in FIG. 6a in the lack of the clutch 36 and in the presence of a friction ring clutch 37. Again, the friction ring clutches 37 may be used only for the trailing edge, only for the leading edge or for both of trailing edge and leading edge. Also, the flank angles of the spindle screws 56 coupled with the trailing edge may differ from the flank angles of the spindle screws 56 coupled with the leading edge in their absolute values, such that the trailing edge and the leading edge may be acted upon differently.

Regarding the actuation arrangements in all of the FIGS. 2a, 3a, 4a, 5a and 6a any of the (six) possible chains of clutch, brake and gearbox may be realized. However, if the gearbox is not the last element in the chain in view of the torque flow, the lever 24 may preferably be coupled to the respective shaft by means of a crank. As another alternative, the respective shaft may be designed as a crank shaft.

Regarding the actuation arrangements in all of the FIGS. 2b, 3b, 4b, 5b and 6b any of the two possible chains of brake and gearbox may be realized.

Finally, if in FIGS. 3a to 6b self-locking spindle screws are used, the brake may be removed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A high lift system for an aircraft, comprising a wing structure and a leading edge slat movably supported relative to a leading edge of the wing structure, the leading edge slat comprising:

a leading edge and a trailing edge, wherein the trailing edge is configured to take different positions to form a gap between the leading edge slat and the wing structure, a skin enclosing an interior space of the leading edge slat, the skin having a flexible leading skin section facing away from the wing structure, and a flexible trailing skin section facing towards the wing structure, and at least one actuation arrangement arranged inside the interior space for selectively introducing normal forces onto the leading skin section and the trailing skin section, wherein said normal forces change the profile of the skin in such a way that the trailing edge changes its position relative to the wing structure to selectively close or open the gap between the leading edge slat and the wing structure, wherein the at least one actuation arrangement comprises a rotary actuator, which is coupled with at least one lever, pivotably attached to a joint on the inside of the trailing skin section and to a joint on the inside of the leading skin section, wherein the rotary actuator, the at least one lever, and the joints are arranged inside the interior space, and wherein the rotary actuator comprises a pair of bevel gears, couplable with a first spindle screw, which engages with a first screw nut coupled to the trailing skin section by a first coupling element, and couplable with a second spindle screw, which engages with a second screw nut coupled to the leading skin section by a second coupling element, wherein the pair of bevel gears, the spindle screws, the screw nuts, and the coupling elements are arranged inside the interior space.

2. The high lift system of claim 1,
wherein the at least one actuation arrangement is configured for introducing normal force in a region distant from the trailing edge, such that due to the change in the profile pulling forces act onto the trailing edge through the skin.

3. The high lift system of claim 1,
wherein the at least one actuation arrangement is configured for bending at least one of the leading skin section and the trailing skin section towards the interior space when normal force is introduced.

4. The high lift system of claim 1,
wherein the at least one actuation arrangement is configured for bending the trailing skin section towards the leading skin section, and
wherein the trailing edge of the skin is urged towards the leading edge of the wing structure upon bending the trailing skin section.

5. The high lift system of claim 1,
wherein the at least one actuation arrangement comprises a release means, which is configured for abruptly releasing normal force introduced by the at least one actuation arrangement.

6. The high lift system of claim 1,
wherein the rotary actuator comprises a motor, a clutch and a gearbox, and
wherein the gearbox is selectively couplable to the motor through the clutch.

7. The high lift system of claim 6,
further comprising a brake, which is coupled with the clutch and the gearbox for selectively arresting the gearbox such that a profile shape is maintainable without the clutch coupling the motor and the gearbox.

8. The high lift system of claim 6,
wherein the gearbox comprises a continuously variable transmission gear.

9. The high lift system of claim 1,
wherein the rotary actuator comprises a motor, a brake and a gearbox, and
wherein the gearbox is permanently coupled with the motor.

10. The high lift system of claim 1,
further comprising a friction ring clutch arranged between the first screw nut and the first coupling element.

11. The high lift system of claim 1,
wherein the at least one actuation arrangement is configured for introducing a normal force onto both of the leading skin section and the trailing skin section at the same time, such that a distance between the leading skin section and the trailing skin section is decreased upon introducing the normal force.

12. The high lift system of claim 1,
comprising a plurality of actuation arrangements, which are driven by a single shaft, which is extending along a nose region of the slat.

13. A high lift system for an aircraft, comprising a wing structure and a leading edge slat movably supported relative to a leading edge of the wing structure, the leading edge slat comprising:

a leading edge and a trailing edge, wherein the trailing edge is configured to take different positions to form a gap between the leading edge slat and the wing structure, a skin enclosing an interior space of the leading edge slat, the skin having a flexible leading skin section facing away from the wing structure, and a flexible trailing skin section facing towards the wing structure, and at least one actuation arrangement arranged inside the interior space for selectively introducing a normal force onto at least one of the leading skin section and the trailing skin section, wherein said normal force changes the profile of the skin in such a way that the trailing edge changes its position relative to the wing structure to selectively close or open the gap between the leading edge slat and the wing structure, wherein the at least one actuation arrangement comprises a rotary actuator, which is coupled with a first lever pivotably attached to a first joint on the inside of at least one of the trailing skin section and the leading skin section, and which is coupled with a second lever pivotably attached to a second joint on the inside of at least one of the trailing skin section and the leading skin section, wherein the rotary actuator, the levers, and the joints being arranged inside the interior space, and wherein the rotary actuator comprises a single transmission shaft coupled to a first pair of bevel gears and to a second pair of bevel gears, the first pair of bevel gears couplable with a first spindle screw, which engages with a first screw nut coupled to the at least one of the trailing skin section and the leading skin section by a first coupling element, and the second pair of bevel gears couplable with a second spindle screw, which engages with a second screw nut coupled to the at least one of the trailing skin section and the leading skin section by a second coupling element, wherein the single transmission shaft, the pairs of bevel gears, the spindle screws, the screw nuts, and the coupling elements are arranged inside the interior space.

14. A high lift system for an aircraft, comprising a wing structure and a leading edge slat movably supported relative to a leading edge of the wing structure, the leading edge slat comprising:
- a leading edge and a trailing edge, wherein the trailing edge is configured to take different positions to form a gap between the leading edge slat and the wing structure,
- a skin enclosing an interior space of the leading edge slat, the skin having a flexible leading skin section facing away from the wing structure, and a flexible trailing skin section facing towards the wing structure, and
- at least one actuation arrangement arranged inside the interior space for selectively introducing normal forces onto the leading skin section and the trailing skin section,
- wherein said normal forces change the profile of the skin in such a way that the trailing edge changes its position relative to the wing structure to selectively close or open the gap between the leading edge slat and the wing structure,
- wherein the at least one actuation arrangement comprises a rotary actuator, which is coupled with at least one lever, pivotably attached to a joint on the inside of the trailing skin section and to a joint on the inside of the leading skin section, wherein the rotary actuator, the at least one lever, and the joints are arranged inside the interior space, and
- wherein the rotary actuator comprises a single transmission shaft coupled to a first pair of bevel gears and to a second pair of bevel gears, the first pair of bevel gears couplable with a first spindle screw, which engages with a first screw nut coupled to the trailing skin section by a first coupling element, and the second pair of bevel gears couplable with a second spindle screw, which engages with a second screw nut coupled to the leading skin section by a second coupling element, wherein the single transmission shaft, the pairs of bevel gears, the spindle screws, the screw nuts, and the coupling elements are arranged inside the interior space.

* * * * *